United States Patent [19]
Conemac

[11] Patent Number: 6,134,050
[45] Date of Patent: Oct. 17, 2000

[54] LASER BEAM MIXER

[75] Inventor: Donald C. Conemac, Moorpark, Calif.

[73] Assignee: Advanced Laser Technologies, Inc., Simi Valley, Calif.

[21] Appl. No.: 09/200,548

[22] Filed: Nov. 25, 1998

[51] Int. Cl.[7] ............................. G02B 27/10; G02B 3/00; G02B 1/10
[52] U.S. Cl. ....................... 359/618; 359/722; 359/583
[58] Field of Search .................... 359/618, 237, 359/719, 722, 637, 583

[56]  References Cited

U.S. PATENT DOCUMENTS

| | | | |
|---|---|---|---|
| 3,818,372 | 6/1974 | Wuerker et al. | 331/94.5 |
| 4,879,722 | 11/1989 | Dixon et al. | 372/21 |
| 5,079,444 | 1/1992 | Kallenbach et al. | 359/328 |
| 5,136,426 | 8/1992 | Linden et al. | 359/583 |
| 5,142,542 | 8/1992 | Dixon | 372/22 |
| 5,144,630 | 9/1992 | Lin | 372/22 |
| 5,151,714 | 9/1992 | Okino et al. | 346/108 |
| 5,175,741 | 12/1992 | Okazaki | 372/75 |
| 5,255,082 | 10/1993 | Tamada | 358/60 |
| 5,295,143 | 3/1994 | Rao et al. | 372/22 |
| 5,296,958 | 3/1994 | Roddy et al. | 359/204 |
| 5,715,021 | 2/1998 | Gibeau et al. | 348/750 |
| 5,995,303 | 11/1999 | Hohugh | 359/708 |

*Primary Examiner*—Georgia Epps
*Assistant Examiner*—Michael A. Lucas
*Attorney, Agent, or Firm*—Graham & James LLP

[57]  ABSTRACT

A laser beam mixer combines two or more input laser beams in a coaxial manner to provide an output beam. At least one of the input beams is altered in cross-sectional profile, for example, to an annular cross-sectional shape. Another input beam is placed within the altered beam by a beam combining element having a transmissive portion and a reflective portion to respectively reflect and transmit the two input beams. The beams are combined with minimal beam losses and without diverging a beam profile.

29 Claims, 7 Drawing Sheets

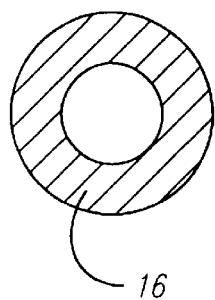 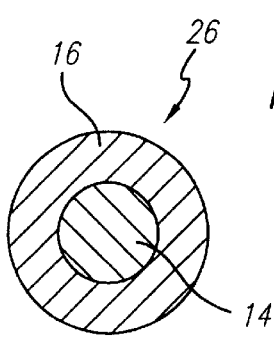 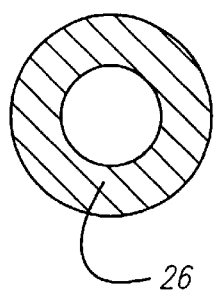 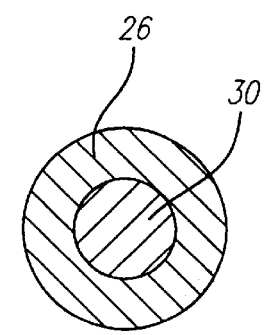
FIG. 3A  FIG. 3B  FIG. 3C  FIG. 3D
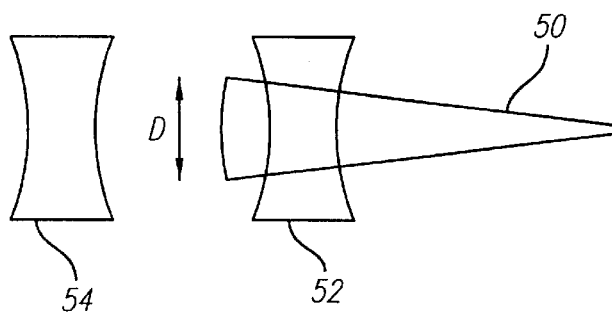
FIG. 4A
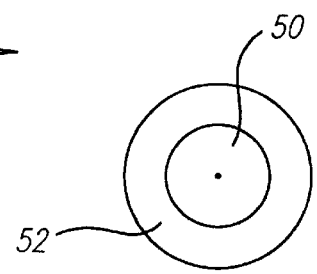
FIG. 4B
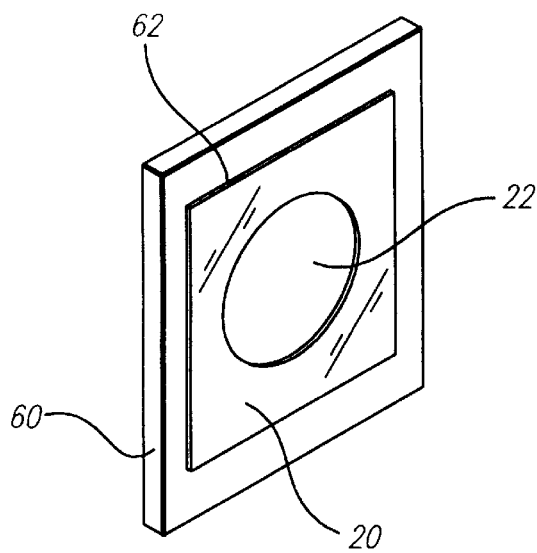
FIG. 5

LASER BEAM MIXER

BACKGROUND OF THE INVENTION

1. Field of the Invention

The present invention relates to apparatus and methods for combining laser beams. The present invention further relates to apparatus and methods employing combined laser beams, such as color laser beam displays and laser beam modulators for fiber optic data transmission.

2. Description of the Prior Art and Related Information

In a variety of applications, it is necessary or advantageous to combine laser beams into a single beam. For example, in a color laser beam display, it is advantageous to combine different color laser beams into a single beam which is then scanned over the display screen. While it is of course possible to combine two or more laser beams at a particular spot simply by directing the beams to converge there, such an approach to combining laser beams is unsuitable if the combined beam itself needs to be scanned. This is the case since the beams will immediately begin to diverge after leaving the spot at which they are brought together. Therefore, if the resulting combined beam is directed down an optical path of any length, the resulting beam diameter will diverge to an unacceptable degree. For example, in a laser beam display such a combined beam resulting from multiple lasers being focused at a single point on the scanning mirror will diverge to an unacceptable degree before contacting the display screen. Alternatively, if the multiple beams are combined at the display screen then separate optical paths and scanning mechanisms are required for each laser beam. This not only introduces space and cost problems but also introduces alignment and reliability issues due to the difficulty of accurately registering multiple beams along multiple optical paths at a moving target point. Therefore, this approach to combining laser beams is also undesirable. Therefore, most applications requiring mixing of laser beams require the capability for producing a combined beam which does not diverge and can be accurately scanned or otherwise optically steered.

In conventional approaches to combining laser beams together into a single beam which does not diverge, a problem arises in that significant losses in the total beam power are experienced. These losses are a direct result of the need to incorporate optical elements which introduce beam losses, such as beam splitters, dichroic mirrors, or filters, in order to combine the multiple laser beams into a single beam.

Referring to FIG. 1, such a prior art laser beam combining apparatus is illustrated in a color laser beam application. The apparatus of FIG. 1 combines red, blue and green laser beams provided from red, blue and green lasers 1, 2, and 3, respectively, so as to provide a multi-color output beam 4. The red and blue laser beams are combined via a first optical element 5, such as a beam splitter or dichroic mirror. As shown, however, this optical element inevitably introduces a loss of beam energy shown by the beam 6 reflected from the front surface of the optical element 5. Similarly, a second optical element 7 is employed to combine the red and blue beams with the green laser beam and this is also accompanied by a loss shown by reflected beam 8. This lost beam energy, represented by beams 6 and 8 in FIG. 1, can constitute a significant portion of the total available energy. For example, beam losses comprising about 35% of the total power of the red laser 1, 25% of the total power of the blue laser 2 and 15% of the total power of the green laser 3 will be experienced in a color laser mixing scheme such as illustrated in FIG. 1.

The above-noted problem of loss of beam energy due to the mixing of the laser beams is exacerbated by the price differentials for available lasers of different power outputs. Typically, increasing the power of a given laser will dramatically increase the cost of the laser. For example, doubling the output power of the laser may require a different type of laser, e.g., a gas laser as opposed to a semiconductor laser, causing the cost to far more than double. Therefore, when losses due to the mixing reduce the brightness of the combined beams to the point where they no longer satisfy the needs of a particular application, the resulting cost increase can be very significant. In some cases, the cost increases introduced by the deficiencies of the laser beam mixing can render a laser based system uncompetitive in the commercial marketplace. Also, higher power lasers are typically bulkier, using additional space which is undesirable in many applications.

The inherent losses of a laser beam mixing system such as shown in FIG. 1 have also rendered it impractical to obtain high power laser beams by simply mixing together multiple lower energy beams of a given frequency or color. As noted above, high power lasers may be quite expensive and as a result, it would be desirable from a cost standpoint to combine several lower cost, lower power lasers to achieve a given power output rather than use a single more expensive high power laser. Due to the high percentage of loss experienced by the beam mixing, however, it quickly becomes impractical to use multiple stages of mixing of laser beams to form such a higher output beam. For this reason, multi-beam mixing systems as sources of higher powered laser beams have not been widely employed in commercial applications.

In view of the foregoing, it will be appreciated that a need presently exists for an efficient way of combining laser beams, such as for color laser beam applications or for creation of higher power output lasers. Furthermore, a need presently exists for a way to combine plural laser beams in an efficient manner which also allows the resulting combined beam to be easily and precisely scanned or otherwise optically steered.

SUMMARY OF THE INVENTION

The present invention provides a laser beam mixing apparatus and method which combines multiple laser beams into a combined laser beam without incurring substantial power losses. The present invention further provides a laser beam mixing apparatus and method which provides a resultant beam which does not rapidly diverge and which may be accurately directed along an optical path and/or scanned in one or more directions.

The present invention provides a laser beam mixing apparatus, and method for combining two or more laser beams, which employs a beam altering element for altering the cross-sectional profile of at least one of the laser beams and a beam combining element for coaxially combining the altered laser beam and another laser beam. In a preferred embodiment, the beam altering element creates an altered laser beam profile having an annular cross-sectional shape and the other laser beam is placed coaxially within the altered beam by the beam combining element. The beam altering element may comprise a reflective pin oriented with the axis thereof aligned with the axis of the laser beam to be altered. The beam combining element may comprise an optical element having a reflective portion and a transmissive portion, configured to receive the two beams on opposite sides so that the reflective portion reflects the altered laser beam and the transmissive portion transmits the other laser beam coaxially within the altered beam. Alternatively, the optical element may be configured so that the reflective portion reflects the unaltered laser beam inside an annular transmissive portion which transmits the altered laser beam.

Since no dispersing optical elements such as beam splitters or filters are employed, minimal beam losses are experienced. Also, since the beams are combined coaxially the combined beam is not subject to divergence and may be optically scanned, steered or otherwise directed along an optical path with a high degree of accuracy. Also, since no wavelength selective elements need be employed, the laser beam mixer of the present invention is suitable for a variety of input laser wavelengths. Also, no detrimental temperature variations are introduced. Furthermore, the laser beam mixing apparatus is of simple construction and may be constructed using inexpensive optical components.

In a further aspect, the present invention provides a color laser beam source, suitable for use in a laser beam display application. The color laser beam source employs a first laser providing a first laser beam of a first color, a second laser providing a second laser beam of a second color, and a third laser providing a third laser beam of a third color. A beam altering element alters the cross-sectional profile of the second laser beam and a beam combining element, configured in the optical path of the first and second laser beams, coaxially combines the first laser beam and altered second laser beam into a first combined laser beam. A second beam altering element alters the cross-sectional shape of the third laser beam or the first combined laser beam. A second beam combining element is configured in the optical path of the first combined beam and the third laser beam and coaxially combines the first combined laser beam and the third laser beam into a color laser beam. Since the individual laser beams are combined with high efficiency a bright color beam is provided. This color laser beam source may be advantageously employed where the first, second and third lasers are laser diodes. For example, the laser diodes may be configured together in a compact array.

In a further aspect, the present invention provides a laser beam amplification apparatus for receiving a plurality of input laser beams and providing a higher intensity combined output beam. The laser beam amplification system employs a plurality of beam combining stages. Each stage employs a beam altering element for altering the cross-sectional shape of one of the input laser beams, and a beam combining element for coaxially combining the altered input laser beam with another input laser beam or a previously combined laser beam. In particular, in the first combining stage the beam combining element combines first and second input laser beams, whereas in subsequent stages the beam combining element combines the output of a prior beam combining stage with another input laser beam. Since the beam combining stages operate to combine the input beams with relatively little loss of beam energy, a number of laser beams may be efficiently combined. Therefore, multiple lower cost lasers may be employed in place of a more expensive high power laser. For example, a plurality of semiconductor lasers may be employed in place of a gas laser.

In another aspect, the present invention provides a laser beam modulator, employing a plurality of lasers of differing frequencies, means for independently modulating the plurality of laser beams, and a plurality of beam combining stages for combining the independently modulated beams. Each of the beam combining stages includes a beam altering element for altering the cross-sectional profile of an incident beam and a beam combining element for coaxially combining the incident beams. In this way, a number of parallel data streams may be frequency multiplexed into a combined beam with little loss of beam energy. This combined beam may be provided to an optical fiber with little loss of beam energy at the fiber/beam interface and provides a fiber optic data transmission system with extremely high data rates.

Further features and advantages of the present invention will be appreciated by a review of the following detailed description of the invention.

BRIEF DESCRIPTION OF THE DRAWINGS

FIGS. 3A–3D are schematic drawings of laser beam profiles taken through the sections of the laser beam path illustrated in FIG. 2.

FIGS. 4A and 4B are side and front views respectively of a reflective optical pin employed in a preferred embodiment of the present invention.

FIG. 5 is a front perspective view of a beam combining element in accordance with a preferred embodiment of the present invention.

DETAILED DESCRIPTION OF THE INVENTION

Figure 1:
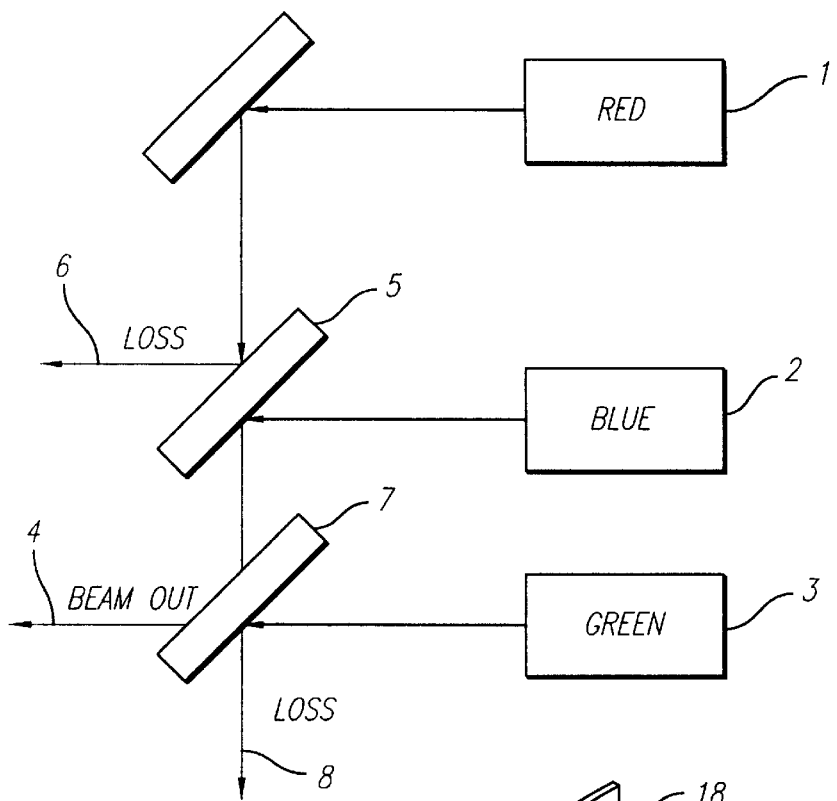
FIG. 1 is a schematic drawing of a prior art laser beam combining apparatus.
Figure 2:
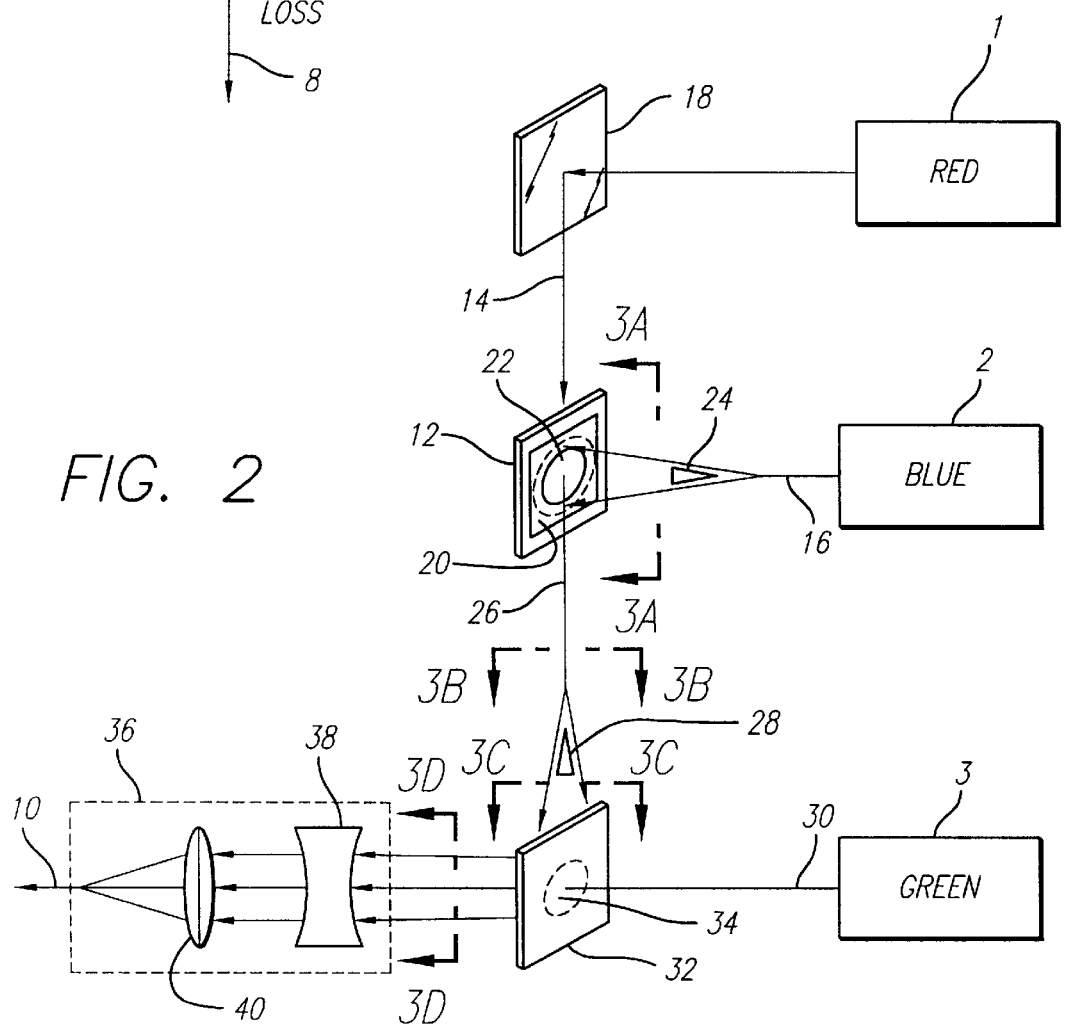
FIG. 2 is a block schematic drawing of a laser beam combining apparatus in accordance with the present invention.

Referring to FIG. 2 and FIGS. 3A–3D, a preferred embodiment of the laser beam mixer of the present invention is illustrated in a schematic drawing. As shown in FIG. 2, the present invention combines laser beams from first, second and third lasers 1, 2, 3, respectively, and provides a combined output beam 10. The illustrated embodiment in FIG. 2 combines laser beams in the primary colors of red, blue and green and provides a multi-color output beam 10. However, it will be appreciated that the present invention may also be applied to mix different colors or different wavelength beams or for other than color laser beam mixing applications, as will be discussed in more detail below.

As shown in FIG. 2, the laser beam mixer of the present invention includes a first optical beam combining element 12 which receives a first laser beam 14, provided from the red laser 1, with a second laser beam 16 provided from the blue laser 2. The first laser beam 14 may be provided via an optional reflective optical element 18 as shown in FIG. 2 or may be directly provided to the laser beam combining element 12 from the laser 1. Reflective element 18 may be employed where it is desirable to mount the lasers in a linear manner, for example, in a compact array configuration. Laser beam combining element 12 includes a reflective portion 20 and a transmissive portion 22. The transmissive portion 22 is generally illustrated in FIG. 2 as a hole in the reflective portion 20. One suitable structure of the beam combining element 12 will be described in more detail below in relation to FIG. 5.

As further illustrated in FIG. 2, the laser beam 16 provided from the second laser 2 is passed through a beam altering element 24 prior to reaching beam combining element 12. Beam altering element 24 alters the cross-sectional profile of the laser beam 16. The laser beams output from the lasers will typically have a Gaussian cross-sectional profile and the laser beam altering element 24 alters the Gaussian cross-sectional profile of beam 16 to form an expanded and generally annular cross-sectional profile. The beam altering element 24, as generally illustrated in FIG. 2, may comprise a reflective optical element having a generally tapered conical shape with the tapering of the optical element being aligned with the direction of the incident laser beam 16. A preferred embodiment of the beam altering element will be described below in relation to FIGS. 4A and 4B. The resulting generally annular shaped cross-sectional profile of the laser beam 16 after passing the beam altering element 24 is illustrated in FIG. 3A. Although the beam profile as shown in FIG. 3A is an idealized annular shape, it will be appreciated that in practice a deviation from this precise geometrical shape may be provided while nonetheless retaining the desirable advantages of the present invention.

Still referring to FIG. 2, the altered laser beam 16 impinges on the reflective portion 20 of the beam combining element 12 as shown by the dashed region on the reflective portion 20. Due to the annular shape (illustrated in FIG. 3A) of the altered beam 16, the laser beam 16 reflected by the reflective portion 20 of the beam combining element encircles the central transmissive portion 22. As further shown in FIG. 2, the first laser beam 14 provided from the first laser 1 passes through the transmissive portion 22 of the laser beam combining element 12. Thus the transmitted first laser beam 14 is configured coaxially within the reflected second laser beam 16 providing a combined output beam 26 comprising the transmitted and reflected beams, respectively. This combined beam comprising the coaxial first and second beams is illustrated in FIG. 3B. The beam profile illustrated in FIG. 3B is shown as a perfectly circular cross-sectional profile, however, it will be appreciated that in practice deviations therefrom may occur while retaining the advantageous features of the present invention. Also, the intensity will not typically be constant across the cross-sectional beam profile (the intensity profile is not shown in FIG. 3B). In particular, the central beam will typically have a Gaussian profile while the outer annular shaped portion of the beam will have an intensity profile determined by the precise shape and orientation of the beam altering element 24 relative the second laser beam 16.

It will be appreciated that the combined beam 26 illustrated in FIG. 3B has a total beam energy which is approximately equal to the combined energy of the first and second beams 14, 16. This is the case since the first beam 16 may be reflected with a high degree of efficiency while the first beam 14 passes through the transmissive portion 22 with nearly 100% efficiency. Therefore, the combined beam 26 will typically have 90% or greater of the energy of the sum of the beam energies of beams 14 and 16.

As further illustrated in FIG. 2, the combined beam 26 next passes to a second beam altering element 28. The second beam altering element 28 may be of the identical design as the first beam altering element 24 and similarly alters the cross-sectional profile of the laser beam 26. For example, as in the case of the first beam altering element 24, the second beam altering element 28 may preferably create an expanded annular cross-sectional profile for the altered beam. This altered beam provided from beam altering element 28 is generally illustrated in FIG. 3C. In a presently preferred embodiment employing a pin shaped reflective optical element the inner portion of the combined beam shown in FIG. 3B is mixed with the outer portion of the beam so that a mixed beam is provided in an annular shaped cross-sectional profile such as shown in FIG. 3C. However, it will be appreciated that precise mixing of the two beams 14, 16 is not necessary for most applications.

As further shown in FIG. 2, the laser beam mixer of the present invention includes a second beam combining element 32. The altered beam 26 is combined with the third laser beam 30 provided from the green laser 3, by the second beam combining element 32. Beam combining element 32 may be of identical construction to beam combining element 12. The orientation is reversed, however, in the schematic drawing illustrated in FIG. 2. That is, the reflective portion of the beam combining element 32 is oriented so as to receive the altered laser beam 26 while the transmissive portion 34 of the laser beam combining element 32 is configured to allow the third laser beam 30 to pass through the beam combining element and combine coaxially with the reflected laser beam 26. Alternatively, the orientation of the second beam combining element 32 may be the same as for beam combining element 12, with beam 30 being altered and reflected and beam 26 transmitted. In such an alternate configuration, however, an additional optical element (not shown) may be needed to reduce the cross-sectional size of the beam 26.

The resulting combined laser beam is illustrated in FIG. 3D and, as may be seen, has the transmitted third laser beam 30 configured inside the annular profile of the reflected beam 26. As in the case of the other illustrations (i.e., FIGS. 3A–3C), the beam profile is idealized in FIG. 3D and variations from the precise circular shape shown therein may be provided while obtaining the desirable advantages of the present invention. It will also be appreciated, for the reasons discussed above, that the combination of beams 26 and 30 results in a beam having a total energy which is substantially equal, e.g., 90% or greater, of the combined energies of the incident beams 26 and 30. This is true since the reflection and the transmission of the laser beams need not employ optical elements such as dichroic filters, beam splitters or other like dispersive optical elements commonly employed in laser beam mixing apparatus.

As further shown in the embodiment of FIG. 2, a beam collimating element 36 may be employed to reduce the cross-sectional size of the combined laser beam and form a more tightly collimated beam provided as the output beam 10. The collimating element 36 may comprise one or more optical elements such as a lens, grating or other optical elements which are well known in the art for providing the desired collimating, and optionally focusing, of the laser beam. For example, as illustrated, a convex and concave lens configuration 38,40, may be combined to provide the desired collimating effect.

Accordingly, it will be appreciated that the output beam 10 provides a multi-colored beam which is tightly collimated. It will further be appreciated that the output beam 10 may be scanned, steered or otherwise provided on an optical path without suffering from detrimental effects due to divergence of the beam. This is achieved due to the coaxial nature of the beam combining steps. Therefore, the color laser beam 10 provided by the laser beam combining apparatus of FIG. 2 may suitably be employed for applications where a collimated color output laser beam is desired; for example, high resolution laser beam displays.

Referring to FIGS. 4A and 4B, one embodiment of beam altering elements 24 and 28 is illustrated in side and front views, respectively. As shown, the beam altering element includes a tapered reflector 50. Optional first and second lens elements 52,54, respectively, are also illustrated. The tapered reflector 50 has a generally conical or pin shape with the tapered direction of the element aligned toward the incident laser beam to be altered. The reflector 50 may comprise a solid element of reflective material, for example, a reflective metal, or may comprise a solid or hollow tapered support substrate coated with a layer of a suitable reflective material. The opening angle (i.e., solid angle) of the cone shaped reflector as well as the diameter (D) of the wide end of the tapered element may be chosen to provide the desired size and profile of the altered laser beam; e.g., a general annular configuration as shown in FIGS. 3A and 3C as described above. Such parameters will typically be determined by the particular application and the characteristics of the laser beam incident on the beam altering element; for example, the beam profile and the diameter of the incident beam. Therefore, a wide variety of combinations of solid angle and D are possible. Also, while the axis of the cone shaped reflector is preferably aligned with the axis of the incident beam, this alignment may deviate from up to about 5° off axis, depending on the beam characteristics, distance between the optical elements and the constraints of the application. In most applications, however, it will be preferable to minimize the angle of deviation of the axis of the reflector 50 from that of the incident laser beam since such deviations will tend to cause the annular shape of the altered beam to become less symmetrical and render it more difficult to provide a tightly focused and collimated output beam.

As further shown in FIGS. 4A and 4B, the cone shaped reflector 50 may be integrated with a collimating lens 52, with the collimating lens 52 annularly surrounding the reflector 50. In this way, the collimating lens 52 may not only serve to collimate the beam reflected from the surface of cone shaped reflector 50 but may also act as a support for the reflector without introducing any beam loss due to the support interfering with the beam path. The collimating lens 52 may also be attached to the large end of the tapered reflector 50. Such a combined lens and reflector structure may be formed by bonding lens 52 to reflector 50 or may be formed from a single shaped piece of optical material with a portion of the material being coated with a layer of reflective material to form the tapered reflector 50. Lens 52 may be a layered lens having refractive properties varying radially from the center thereof to enhance the collimating effect. As further shown in FIG. 4A, a second lens 54 may be provided, depending on the length of the beam path, for further collimating the altered beam. It will also be appreciated that in some applications these optical elements 52, 54 may be dispensed with and only a support structure provided for reflector 50.

In a further modification, reflector 50 may be mounted to rotate or vibrate about its long axis. This may be used to reduce speckle effects present in some applications.

Referring to FIG. 5, a preferred embodiment of the beam combining element 12, 32 is illustrated in a front perspective view. As shown, the beam combining element may comprise a substrate 60, e.g., composed of a high quality transparent material such as quartz or glass with a reflective layer 62 coated thereon to form reflective portion 20. The transmissive portion 22 may simply comprise a circular opening in the reflective layer 62 which may be provided by masking or etching as is well known in the film deposition art. Alternatively, the transmissive portion 22 may be formed by providing a hole completely through the substrate 60. Such a hole may be punched, drilled or etched depending on the thickness and material of substrate 60. In an embodiment where the transmissive portion 22 comprises a hole through the substrate 60, the substrate 60 may comprise solid block of reflective material, such as a reflective metal, or may comprise a non-reflective substrate coated with reflective layer 62 as previously described. Either approach may suitably provide the desired high efficiency reflective portion 20 and the high efficiency transmissive portion 22 desired for a high efficiency beam combining element described above. Other means for creating reflective and transmissive portions are also known in the optical art and may be employed.

Figure 6:
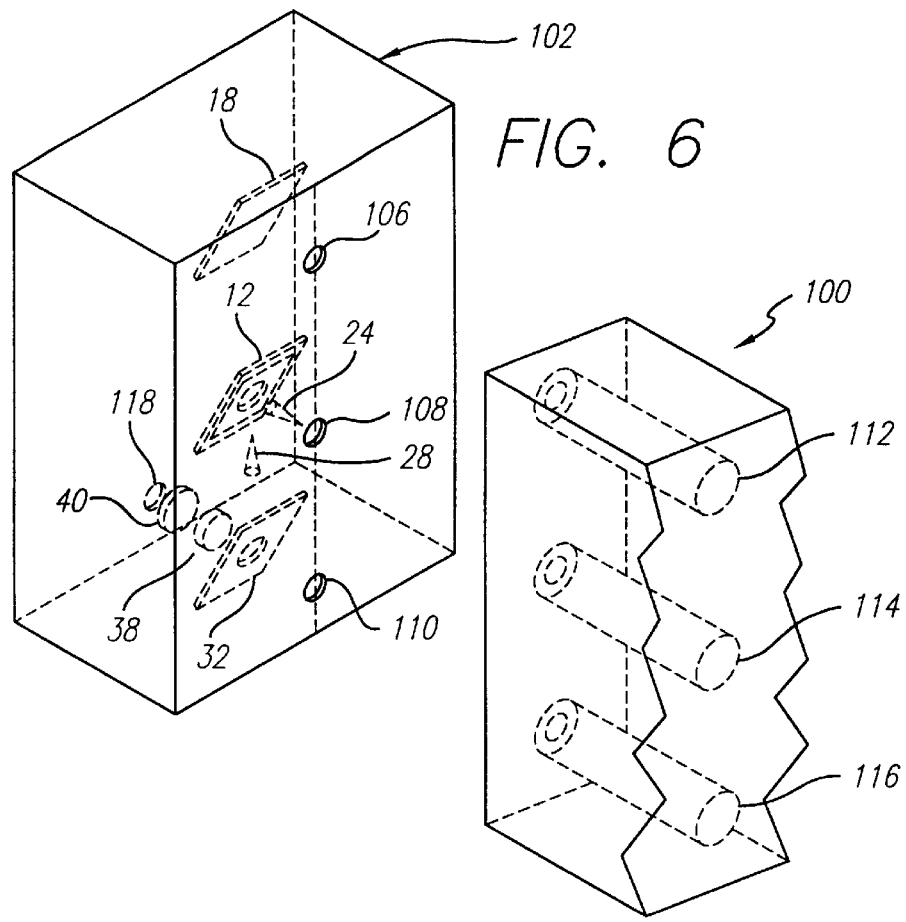
FIG. 6 is a perspective view of a laser beam combining apparatus and associated laser array in accordance with a preferred embodiment for mounting of the present invention.

Referring to FIG. 6, a compact mounting configuration for the laser beam combining apparatus described above is illustrated in conjunction with a compact multi-laser source 100. For example, laser source 100 may comprise an array of lasers, 112, 114, 116, for example, comprising semiconductor lasers. It will be appreciated that while a single column of three laser diodes is illustrated for diode array 100 along with a beam combining apparatus 102 adapted for three input beams, the diode array 100 may be extended to include multiple columns of laser diodes with the structure in the laser beam combining apparatus 102 duplicated accordingly, For example, a laser diode array having multiple rows and columns of laser diodes is described in U.S. patent application Ser. No. 09/169,163 filed Oct. 8, 1998, the disclosure of which is incorporated herein by reference.

As shown the support structure 102 has a rectangular shape with a first surface having transparent input ports 106, 108, 110 for receiving the input laser beams from the lasers 112, 114, 116. As shown, the optical elements 12, 18, 24, 28, 32, 38 and 40 may be configured in a compact configuration in support structure 102. The output beam in turn is output through output port 118 in a second major surface of the support structure 102. The input and output ports 106, 108, 110 and 118, respectively, may be holes in transparent insert into the structure 102 or may simply be holes in the support structure 102. Alternatively, the entire support 102 may be composed of a transparent material. Also, it will be appreciated that the beam path of the input laser beams through the optical elements configured inside the support 102 will be optically transparent, for example, composed of a transparent material or elongated openings formed in the support 102 along the optical path of the beams between the input ports and the output port 118.

The rectangular shape illustrated for the support structure 102 provides a compact structure which may be readily mounted to a circuit board or other mounting structure, and may be used in a modular manner, e.g., stacked to provide multiple beam combining structures, either in a side by side, vertical, or array configuration. It will be appreciated, however, that the rectangular structure 102 may be modified to other shapes, based on the needs of the particular application.

Figure 7:
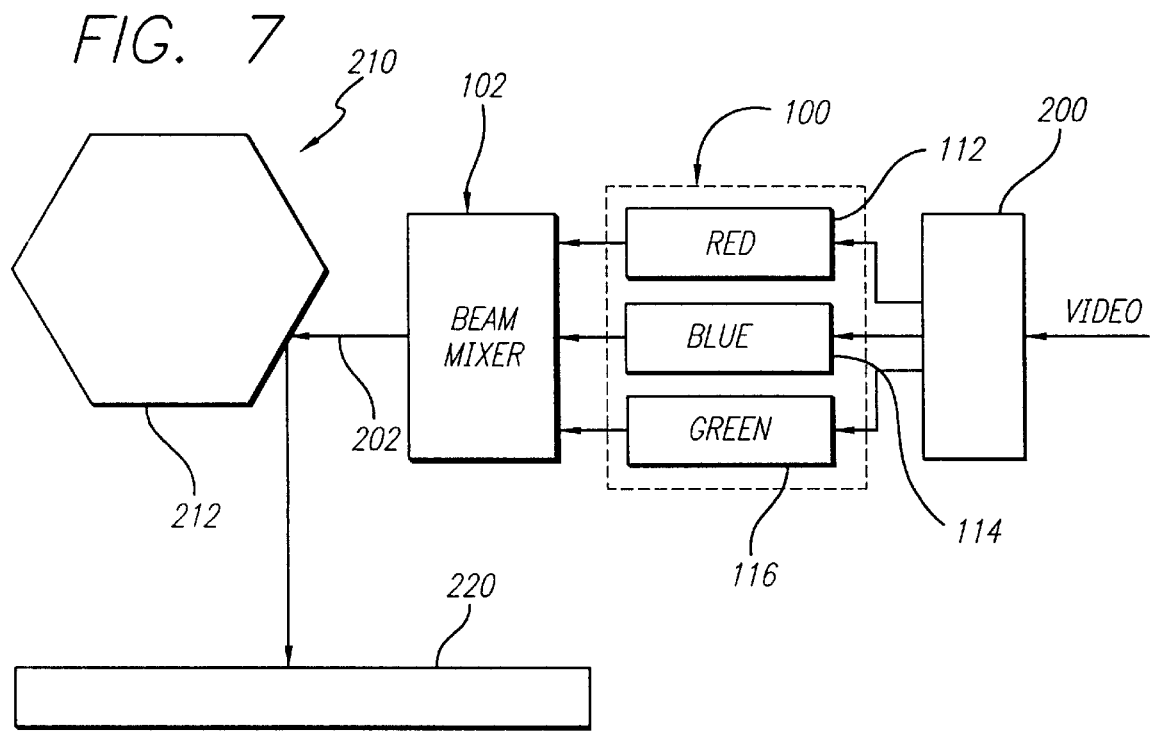
FIG. 7 is a block schematic drawing of a laser beam display apparatus in accordance with another embodiment of the present invention.

Referring to FIG. 7, a color laser beam display apparatus is illustrated in accordance with another aspect of the present invention. The laser beam display shown in FIG. 7 incorporates the laser beam combining apparatus described above in relation to FIGS. 2–6. For compact displays, the display may preferably incorporate a compact combining structure 102 such as described above in relation to FIG. 6 along with an array of laser diodes 100. Both the combining structure 102 and array 100 may be stacked in a modular manner to create a multi-line scanning pattern such as described in the above-noted application Ser. No. 09/169,193 incorporated herein by reference. The individual lasers are driven by control electronics 200 which receives an input video signal and provides appropriate drive signals to the individual lasers. A suitable implementation of control electronics 200 is described in the above-noted application Ser. No. 09/169, 193 the disclosure of which is incorporated herein by reference. The output laser beam from the beam combining structure 102 is provided to a movable reflector 210 which scans the beam over the display screen 220. As illustrated, the movable reflector 210 is preferably a rotatable polygon with a plurality of reflective sides or facets 212. Although only six flat sides or facets 212 are illustrated in FIG. 7 for convenience of illustration, preferably a larger number of facets will be provided each tilted at a differing angle so as to scan the laser beam across different lines (or groups of lines if a multiple row laser diode array is employed) with a full rotation of the polygon causing the entire screen 220 to be illuminated. Such a tilted facet approach to scanning the surface of a display screen is also described in the above noted application Ser. No. 09/169,193.

It will be appreciated that the laser beam display illustrated in FIG. 7 can provide a bright image on display screen 220 by virtue of the high efficiency combination of the individual laser beams provided from laser diode array 100. Also, since the beams are combined in a coaxial manner, the registration of the output beam 202 on the screen 220 may be precisely controlled and separate optical paths or steering mechanisms for the individual laser beams need not be provided. Furthermore, the combined beam 202 is not subject to temperature effects. Accordingly, the laser beam display of FIG. 7 has advantages both in terms of quality of the image displayed and the cost of manufacture of the system.

Figure 8:
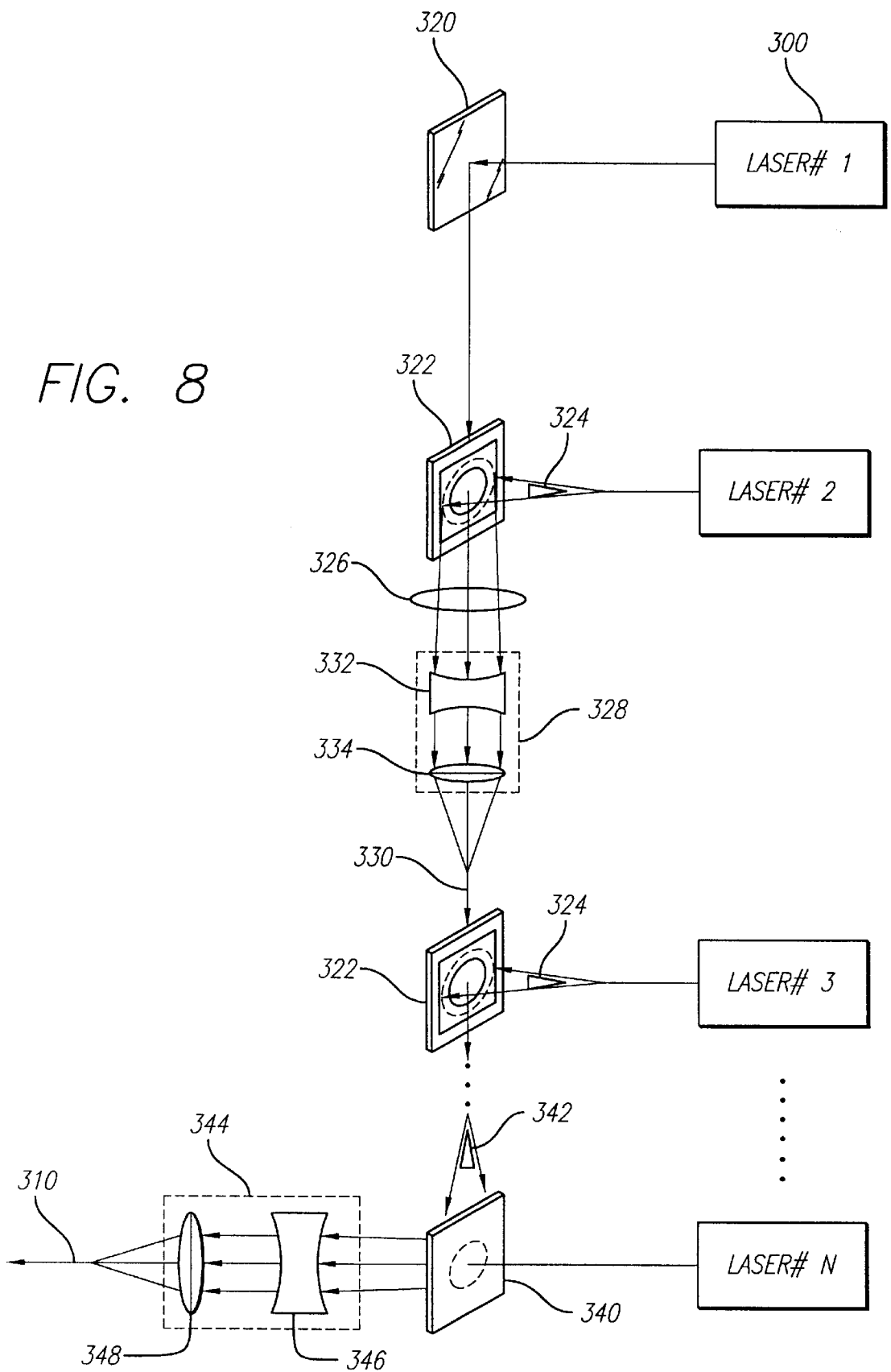
FIG. 8 is a block schematic drawing of a laser beam power amplification apparatus in accordance with an alternate embodiment of the present invention.

Referring to FIG. 8, a laser beam amplification apparatus in accordance with a further aspect of the present invention is illustrated in a schematic drawing. As shown, the output beams from a plurality of lasers 300 are combined to produce a higher intensity output beam 310 with relatively little energy loss. The laser beam amplification apparatus includes an optional reflective optical element 320 which may be employed if it is desired to place the plurality of laser beams 300 into an array or if it is otherwise desired to arrange the beams in an orderly layout. The apparatus further includes a plurality of beam combining elements 322 and a plurality of beam altering elements 324 configured in a series of beam combining stages for combining the input laser beams.

In particular, as shown in FIG. 8, a first combining stage combines the output beam from laser #2 with the beam from laser #1 to provide a first combined output beam 326. The beam altering element 324 and beam combining element 322 may operate as in the embodiment described in relation to FIGS. 2–6; for example, the beam altering element 324 may be as illustrated in FIGS. 4A and 4B while the beam combining element 322 may be as illustrated in FIG. 5. The output beam 326 from the first combining stage will have an expanded beam diameter due to the action of the beam altering element 324. Therefore, a collimating element 328 is provided to reduce the beam diameter to provide a collimated output beam 330 from the first stage. The collimating element 328 may include conventional optical elements known in the art suitable for providing a reduced cross section laser beam from an input beam and may for example comprise first and second lens 332, 334 as illustrated.

The collimated output beam 330 from the first beam combining stage is then passed to the second beam combining stage. The second beam combining stage receives an input beam from laser #3 and provides an altered beam via second beam altering element 324. This altered beam is provided to a second beam combining element 322. The second beam combining element 322 combines the collimated output beam 330 from the first stage with the altered beam from laser #3 in the same manner as in the operation of the first stage of the amplification apparatus. The result is a combined beam including beams from lasers #'s 1, 2 and 3 with substantially no power loss and without significant beam divergence. This combined beam is then collimated via another collimating element (not shown) and passed to the next stage.

These amplification stages are repeated for a desired number of input laser beams until the final stage. As illustrated in FIG. 8 the final stage combines an input laser beam from laser #N with the combined output beam from the previous combining stage. While this last stage may be constructed in the same manner as the prior stages, as illustrated in FIG. 8, the beam combining element 340 for the final stage may also be inverted such that the combined beam from the previous stage is altered by beam altering element 342 (which may be identical to the beam altering elements 324) and reflected. The beam from laser #N in turn passes through the transparent portion of the beam combining element 340, coaxially with the reflected beam. This configuration has the advantage of avoiding a collimating element between the final two stages.

An optional collimating element 344 is also shown after the final combining stage. This provides a narrower beam diameter for output beam 310 and may provide a desired collimated and focused output beam as needed for the particular application requirements. As illustrated, the collimating element 344 may include first and second lenses 346, 348 or other optical elements known in the art.

Accordingly, it will be appreciated that the apparatus of FIG. 8 provides a highly efficient laser beam amplifier for receiving N input laser beams and providing a single high intensity output beam. In particular, the output beam 310 includes substantially all the energy of the input laser beams while at the same time providing a collimated beam which is not subject to undesirable beam divergence. Also, the apparatus illustrated in FIG. 8 is suitable for a variety of different wavelength input laser beams since no wavelength selective optical elements are employed in the combining pages. Also, the apparatus of FIG. 8 is not subject to undesirable temperature related variations. Furthermore, the laser beam amplification apparatus shown in FIG. 8 is of a relatively simple construction which may be readily constructed using inexpensive optical components. The amplification apparatus of FIG. 8 is thus suitable for a variety of applications. For example, the amplification apparatus of FIG. 8 may employ a plurality of laser diodes as a source of a laser beam which would normally require a gas laser of higher cost.

Figure 9:
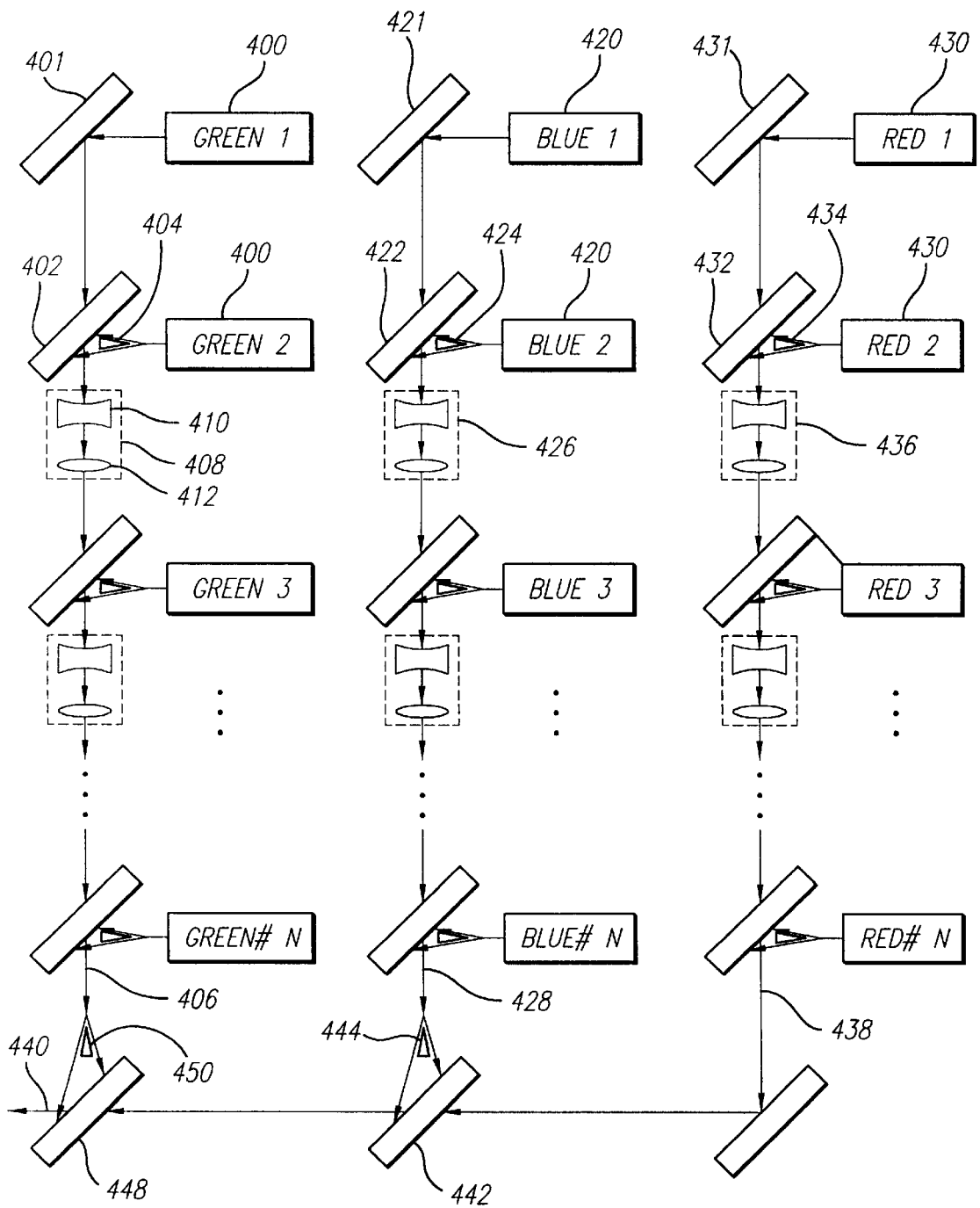
FIG. 9 is a block schematic drawing of a multi-color laser beam source employing plural combined laser beam sources for each primary color, in accordance with another embodiment of the present invention.

Referring to FIG. 9, a color laser beam source is illustrated in a further aspect of the present invention. The color laser beam source of FIG. 9 may be suitably employed where it is desirable to provide a bright multi-color output laser beam employing a plurality of lower intensity lasers. For example, it may be advantageous for cost reasons to employ a plurality of lower power lasers corresponding to each color rather than employing a higher intensity laser for each color. For example, it may be advantageous to employ a plurality of semiconductor lasers for each color as opposed to employing a single gas laser or solid state laser of higher intensity output. Also, the laser beam source of FIG. 9 may be advantageous where a particular desired wavelength is available in a lower intensity laser whereas a higher intensity laser would require use of filtering, frequency shifting or some other approach to provide the desired wavelength of laser light. Also, it may be advantageous for space reasons to employ a plurality of low power lasers, such as semiconductor lasers configured in an array, as opposed to a gas or solid state laser.

Referring to FIG. 9, the color laser beam source includes a plurality of individual lasers for each of the desired colors, e.g., the primary colors red, blue and green. In particular, a first plurality of green lasers 400 provide corresponding output beams which are combined via a plurality of beam combining elements 402 and a plurality of beam altering elements 404 to provide a combined green laser beam 406. Where it is desirable for mounting or space considerations to arrange the plurality of lasers in a column or in a line, for example, where the multiple lasers are to be combined in an array or mounted in a modular or otherwise repeating manner, it may be desirable to include a reflector 401. The beam combining elements 402 and the beam altering elements 404 may be as described above in relation to FIGS. 2–6. Therefore, for the reasons discussed above, the beam combining elements will provide coaxial high efficiency combination of the individual green laser beams into a single output beam 406. For example, if N green lasers 400 are provide, each of power P, the combined output beam 406 may have 90% or greater of the total output power N×P. As further shown in FIG. 9, a beam collimating element 408 is preferably provided between the various beam combining stages, which beam collimating element may comprise any of a variety of well known optical elements for collimating a laser beam and may include lenses 410, 412 as illustrated. The collimating elements 408 act, as in the case of the previously described embodiment, to allow the altered and combined output beam from each combining stage to be reduced in size so as to be more readily combined at the next combining stage.

The plurality of blue and red laser beams are combined in the same manner as described above in relation to the green laser beams. In particular, a plurality of blue lasers 420 provide corresponding output beams which are combined in a series of combining stages, each stage including a combining element 422, a beam altering element 424 and optionally a beam collimating element 426 to produce a combined blue output beam 428. Also, as in the case of the green laser beams, where desirable for space or mounting considerations an optional reflector 421 may be employed. Similarly, a plurality of red laser beams 430 are combined in a plurality of combining stages, each stage including a combining element 432, a beam altering element 434, and an optional beam collimating element 436 to provide combined red output beam 438. As in the case of the green laser beams, where desirable for space or mounting considerations an optional reflector 431 may be employed.

Each of the combined individual color beams, i.e., combined green beam 406, blue beam 428 and red beam 438, are in turn combined to form a high intensity multi-color beam 440. In particular, the red beam 438 and the blue beam 428 are combined at a combining stage including a beam combining element 442 and a beam altering element 444 to provide a red and blue combined high intensity beam 446. Beam 446 in turn is combined with the green combined beam 406 at another beam combining stage including beam combining element 448 and beam altering element 450.

Therefore, it will be appreciated that the output beam 440 will be of high intensity with relatively little loss of beam energy due to the combining stages. The combined multi-color output beam 440 also is not subject to divergence and may be steered, for example, by scanning using a rotatable polygon reflector or other scanning means, in a precisely controllable manner. The multi-color laser beam source illustrated in FIG. 9 may thus be advantageously employed in a laser beam display application and may be incorporated for the beam source as illustrated in FIG. 7. Also, the lasers 400, 420 and 430 may be advantageously arranged in a compact array structure in accordance with the teachings of the above-referenced application Ser. No. 09/169,193 the disclosure of which is incorporated herein by reference, to comprise a bright laser beam display using relatively low power semiconductor diode lasers.

The combining stages illustrated may be modified in a variety of ways while still providing the desired result. For example, each row of beams (i.e., red, blue and green laser beams) may first be combined and then the plural combined colored beams combined. Other configurations are also possible.

Figure 10:
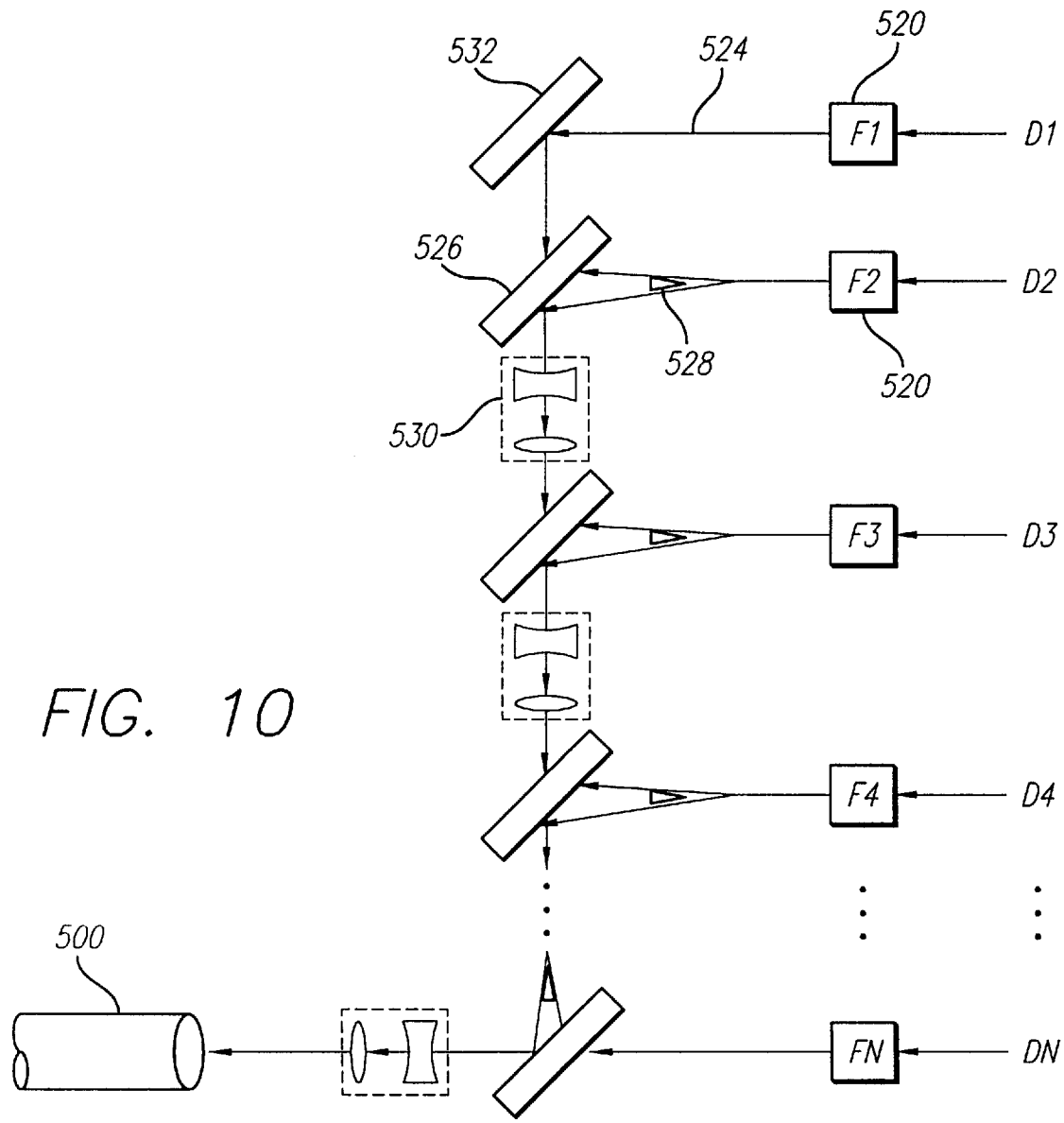
FIG. 10 is a block schematic drawing of a frequency multiplexed laser beam modulator employing multiple parallel data inputs, in accordance with another alternate embodiment of the present invention.

Referring to FIG. 10, a laser beam modulator is illustrated in a block schematic drawing in accordance with another aspect of the present invention. The laser beam modulator illustrated in FIG. 10 may provide extremely high data rate transmission, for example, through a fiber optic cable 500 by providing a modulated laser beam 510 having a plurality of frequency multiplexed channels. For example, a multi-frequency system is illustrated in FIG. 10 having N separate lasers 520 each operating at a discrete frequency, illustrated as frequencies F1-FN.

The individual lasers 520 may preferably be laser diodes which are modulated on and off by input data signals which drive the diodes. Alternatively, lasers 520 may be continuous beam lasers of gas or solid state type known in the art with the input data signal driving an acousto optic modulator (AOM) to provide a plurality of modulated beams. In either case, as shown in FIG. 10, separate data streams D1-DN may be provided to individually modulate the laser beams to provide plural independent channels of information to be transmitted. Optional reflector 532 may be employed to facilitate the alignment and mounting of the individual lasers 520 in an array or other manner as illustrated in FIG. 10. The individual modulated beams 524 are combined through a plurality of combining stages in order to provide output beam 510. In particular, each combining stage includes a beam combining element 526 and a beam altering element 528 along with an optional beam collimating element 530. Each of these elements operates in accordance with the previously described embodiments and it will be appreciated that each combining stage coaxially combines the input beams to provide a combined beam which may be precisely steered in an optical path as desired. An additional collimating element 532 may also be provided to focus and collimate the combined beam before directing it to optical transmission fiber 500.

Accordingly, it will be appreciated that the laser beam modulator illustrated in FIG. 10 provides a high capacity multi-channel data transmission system suitable for fiber optic data communication links or other optical data, voice or video transmission applications. In particular, the ability to provide a plurality of separate laser beam channels in a single beam 510 allows a large number of channels to be multiplexed without unacceptable energy losses. Also, losses associated with directing beams at differing angles into optical fiber 500 can be avoided using the coaxial beam of the present invention, thereby using the data transmission efficiency of the fiber optic transmission system to its full extent. When decoding at the other end of the fiber optic cable, one can use FIG. 5 to decode each ring.

Figure 11:
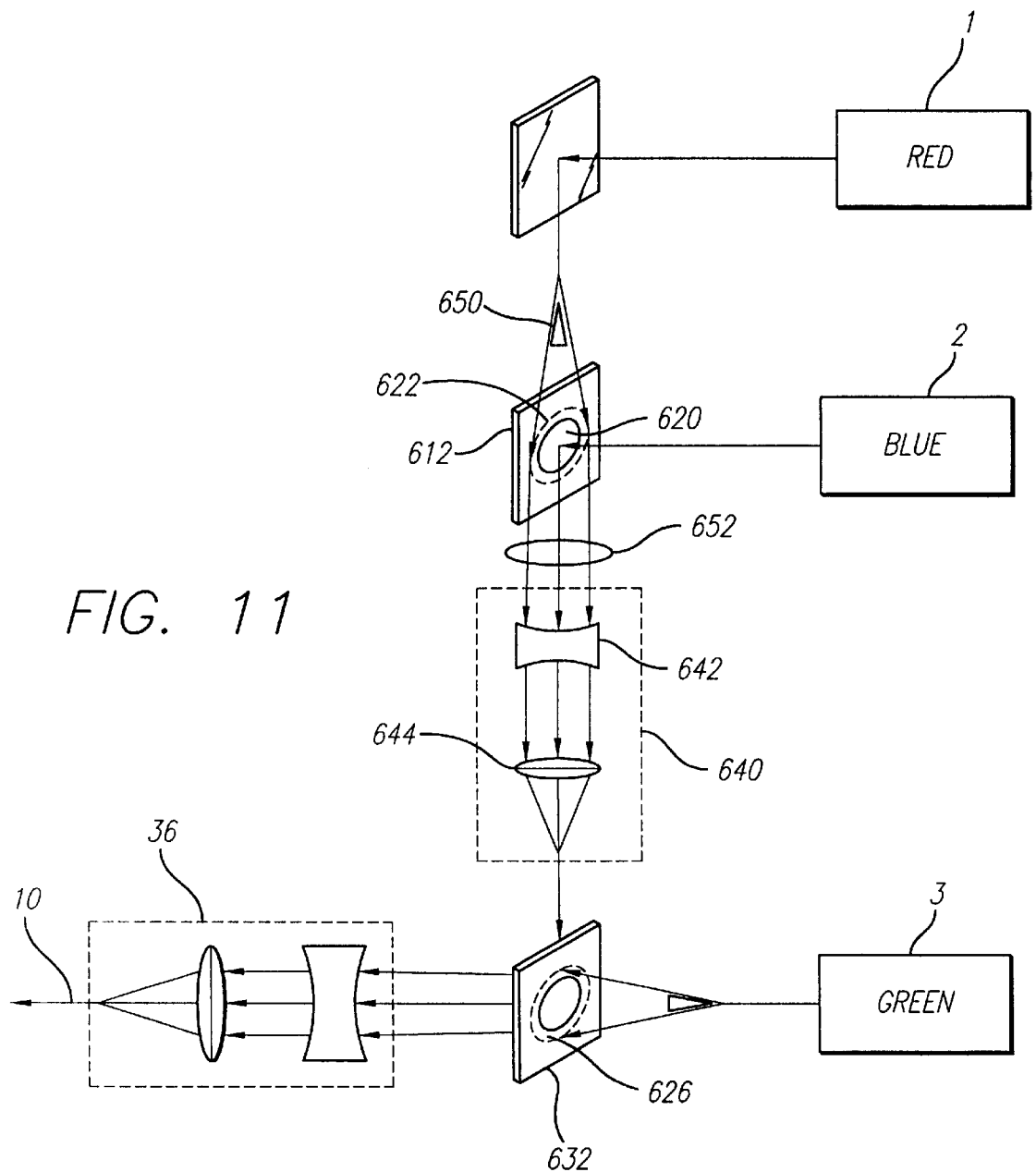
FIG. 11 is a block schematic drawing of a modified laser beam combining apparatus in accordance with the present invention.

Referring to FIG. 11, an alternate embodiment of the laser beam mixing apparatus of FIG. 2 is illustrated. FIG. 11 is provided to illustrate the manner in which the various elements may be easily altered while remaining within the scope of the present invention and while achieving similar or identical results to those described previously. In particular, it will be appreciated by comparison of the embodiment of FIG. 11 with that of FIG. 2 that the beam combining elements and the orientation of the beam altering elements have been modified from that described in relation to FIG. 2, but nonetheless identical results are achieved. In particular, as described in relation to FIG. 2, red, blue and green lasers 1, 2, 3, respectively, provide respective red, blue and green laser beams which are combined to provide a single collimated output beam 10 as in the case of the embodiment of FIG. 2.

In the embodiment of FIG. 11, the beam combining elements 612 and 632 differ from the beam combining elements 12 and 32 described above in relation to FIG. 2 in that the reflective and transmissive portions have been interchanged. Reflective portion 620 is thus a central region as illustrated whereas the transmissive portion is an annular outer region 622. Also, an additional collimating element 640 is preferably provided which may include well known optical elements for collimating and reducing the cross-sectional size of the laser beam, for example, including lenses 642 and 644 as illustrated.

In operation, the laser beam provided from red laser 1 is altered in cross-sectional profile by beam altering element 650 which preferably creates an annular cross sectional profile for the red laser beam such that the red laser beam can pass through the annular shaped transmissive portion 622 of the beam combining element 612. The blue laser beam from blue laser 2 in turn is reflected off central reflective portion 620 of the beam combining element 612. In this way, a combined beam 652 is provided which has the blue beam coaxially within the red beam. The combined beam 652 is of expanded cross-sectional size so it is preferably passed through beam collimating element 640 which reduces the cross-sectional size of the beam to a more tightly collimated beam. This beam in turn is passed to the second beam combining element 632 and reflects off the central reflective portion (not shown) of the second beam combining element 632. The green laser beam from green laser 3 in turn is passed through a second beam altering element 654 which provides an annular shaped cross-sectional profile for the green beam. This altered beam passes through the annular shaped transmissive portion 626 in the second beam combining element 632. In this way, a combined output beam is provided having the combined red and blue laser beam coaxially configured inside the annular shaped green beam to provide a coaxial combined beam. This combined beam will be then collimated by second beam collimating element 36 to provide a tightly collimated output beam 10 which may be optically steered or otherwise handled as described in relation to the previous embodiment. It will be appreciated that a similar modification may be made in the other illustrated embodiments.

Accordingly, it will be appreciated that a variety of modifications may be made to the specific previously described embodiments while remaining within the scope of the present invention. Accordingly, the foregoing embodiments should not be viewed as limiting in nature but purely illustrative.

What is claimed is:

1. An apparatus for combining first and second light beams, comprising:

a first optical element having first and second sides and configured in the optical path of both the first and second light beams so as to receive said beams on opposite sides, said first optical element having a reflective portion and a transmissive portion with the transmissive portion configured in the path of the light beam and the reflective portion in the path of the second light beam; and a second optical element configured configured in the path of the second light beam, said second optical element optically altering the cross-sectional shape of the second light beam;

wherein the second optical element is configured relative to the first optical element such that the second light beam reflects off of the reflective portion of the first optical element coaxially with the transmitted first light beam.

2. An apparatus for combining first and second light beams, as set out in claim 1, wherein the transmissive portion of the first optical element comprises a circular portion and wherein the reflective portion surrounds said circular transmissive portion on one side of the optical element.

3. An apparatus for combining first and second light beams, comprising:

a first optical element having first and second sides and configured in the optical path of both the first and second light beams so as to receive said beams on opposite sides, said first optical element having a reflective portion and a transmissive portion with the transmissive portion configured in the path of the first light beam and the reflective portion in the path of the second light beam; and a second optical element configured configured in the path of the first light beam, said second optical element optically altering the cross-sectional shape of the first light beam;

wherein the second optical element is configured relative to the first optical element such that the second light beam reflects off of the reflective portion of the first optical element coaxially with the transmitted first light beam.

4. An apparatus for combining first and second light beams, as set out in claims 1 or 3, wherein said second optical element comprises a reflective pin having a long axis generally aligned with the light beam direction and a shape tapering in the direction of the incident light beam.

5. An apparatus for combining first and second light beams, as set out in claim 4, wherein said reflective pin alters the cross sectional shape of the light beam to an annular shape and wherein said first and second beams are combined so as to be annularly configured one within the other.

6. An apparatus for combining first and second light beams, as set out in claim 4, wherein the long axis of the second optical element and the axis of the incident light beam are aligned to within about five degrees.

7. An apparatus for combining first and second light beams, as set out in claim 3, wherein said reflective portion of the first optical element comprises a circular region on one side of the optical element and the transmissive portion surrounds the circular transmissive region.

8. An apparatus for combining first and second light beams, as set out in claims 1 or 3, wherein said transmissive portion of said first optical element comprises a hole passing between the first and second sides of the element.

9. An apparatus for combining first and second light beams, as set out in claims 1 or 3, wherein said first optical element is composed of a light transmissive material at the wavelength of the light beams and wherein said reflective portion is comprised of a reflective coating on said light transmissive material, said reflective coating having an opening corresponding to said transmissive portion of said first optical element.

10. A light beam mixing apparatus for combining first and second light beams, comprising:
   means for optically distorting the cross-sectional profile of said second light beam; and
   means, configured in the optical path of said first and second light beams, for combining the first light beam and distorted second light beam into a combined light beam having the first light beam and distorted second light beam coaxially combined.

11. A light beam mixing apparatus as set out in claim 10, wherein said means for optically distorting creates a distorted light beam having an annular cross-sectional shape.

12. A light beam mixing apparatus as set out in claim 11, wherein said means for optically distorting comprises a reflective pin oriented with the axis thereof aligned with the axis of the second light beam.

13. A light beam mixing apparatus as set out in claim 12, wherein said means for optically distorting further comprises a lens configured about the reflective pin.

14. A light beam mixing apparatus as set out in claim 11, wherein said means for combining provides combined beam having said first light beam inside said annularly shaped second light beam.

15. A light beam mixing apparatus as set out in claim 10, wherein said means for combining comprises an optical element having a reflective portion and a transmissive portion.

16. A light beam mixing apparatus as set out in claim 15, wherein said optical element is configured so that said reflective portion intercepts said first light beam and said transmissive portion intercepts said distorted second light beam.

17. A light beam mixing apparatus as set out in claim 15, wherein said optical element is configured so that said reflective portion intercepts said distorted second light beam and said transmissive portion intercepts said first light beam.

18. A light beam mixing apparatus as set out in claim 15, wherein said transmissive portion comprises a hole in said optical element.

19. A light beam mixing apparatus as set out in claim 10, further comprising means for altering the cross-sectional shape of the combined beam to a substantially Gaussian cross-sectional shape.

20. A method for combining first and second light beams comprising the steps of:
   altering the cross-sectional profile of the first light beam to a generally annular shape; and
   combining the second light beam with the first light beam so as to be coaxially configured within the first beam's annular cross-sectional profile.

21. A method as set out in claim 20, wherein said step of combining comprises:
   reflecting said first beam off of a reflector having a central transmissive portion; and
   directing said second light beam through said transmissive portion, in a direction coaxial with the reflected first light beam.

22. A method as set out in claim 20, further comprising the step of adjusting the cross-sectional shape of the combined beam to a narrower profile.

23. A method as set out in claim 20, wherein said step of altering the cross-sectional shape of the first light beam comprises reflecting the first light beam off of a tapered reflector.

24. A method as set out in claim 23, wherein the tapered reflector is substantially aligned with the beam axis of the first light beam and tapers in the direction of beam incidence.

25. A method as set out in claim 20, wherein the first light beam has a generally Gaussian cross-sectional profile prior to said altering step.

26. A method as set out in claim 20, wherein said step of altering further comprises expanding the cross-sectional diameter of the first light beam.

27. A method as set out in claim 20, wherein said step of altering retains greater than 90 percent of the beam energy in the altered beam.

28. A method as set out in claim 20, wherein the first and second light beams have different frequencies.

29. A method as set out in claim 20, wherein the first and second light beams have the same frequency.

* * * * *